United States Patent [19]

Brown

[11] 3,852,046
[45] Dec. 3, 1974

[54] METHOD FOR RECYCLING WASTE PLASTICS AND PRODUCTS THEREOF

[76] Inventor: Henry J. Brown, 421 Margo Ave., Long Beach, Calif. 90814

[22] Filed: Jan. 3, 1973

[21] Appl. No.: 320,694

Related U.S. Application Data

[62] Division of Ser. No. 191,901, Oct. 22, 1971, abandoned.

[52] U.S. Cl. .................. 44/1 R, 44/1 D, 44/10 R, 44/25
[51] Int. Cl. .......... C10l 5/14, C10l 5/00, C10l 5/40
[58] Field of Search ............. 44/10 R, 1 R, 1 D, 17, 44/25; 260/2.3

[56] References Cited
UNITED STATES PATENTS

| | | | |
|---|---|---|---|
| 3,232,721 | 2/1966 | Coyner | 44/10 R |
| 3,637,355 | 1/1972 | Brockbank | 44/1 R |
| 3,726,652 | 4/1973 | Schick | 44/17 X |

Primary Examiner—C. Dees
Attorney, Agent, or Firm—Jerry R. Seiler

[57] ABSTRACT

Waste plastics comprising a mixture of two or more thermoplastic materials are treated by grinding the products to form a particulate thermoplastic mixture, washing the particulate mixture to remove non-plastic materials, placing the thermoplastic mixture in a mold or shaped vessel, and heating the mixture to a temperature above the softening point of the lower melting thermoplastics and below the temperature of the softening point of the highest melting thermo-plastic of the mixture. In another embodiment, particulate thermo-plastic is used as a filler for asphalt compositions. In a further embodiment, waste thermoplastics are mixed with combustible cellulosic materials and formed into logs and the like which thermoplastic mixture has been treated to remove halogen containing thermoplastic such as polyvinyl chloride.

2 Claims, No Drawings

METHOD FOR RECYCLING WASTE PLASTICS AND PRODUCTS THEREOF

This is a division of application Ser. No. 191,901, filed Oct. 22, 1971, now abandoned.

BACKGROUND OF THE INVENTION

With the advent of plastics, many container products are now being made of these relatively low cost, strong and impact resistant materials. For example, many containers which had previously been made from glass or cardboard or other cellulosic materials which are easily reduced in bulk and in the latter case burned or otherwise destroyed are now replaced with plastic. Plastics normally used for packaging and as containers include polyethylene, both high and low density, polystyrene, polyvinyl chloride, and polypropylene. Further, high impact resistant plastics such as acrylonitrile-butadiene-styrene terpolymers are extensively used in preparing household appliances, toys and the like. A great variety of other plastics, too numerous to mention here are also used for producing many other items once prepared from metal or wood production, all of which present a special problem in waste disposal.

Of special interest are the plastics used for containers, which are generated at an alarming rate, because of the difficulty in disposing of these materials due to their high-bulk and resistence to compression, oxidation, etc. It has been estimated that of the annual 400 million tons of collected solid waste as refuse from municipal and industrial sources, plastics constitute approximately 8 million tons. Although the plastics often burn easily, some are ignited or burned only with difficulty, while others such as the halogen containing plastics like PVC are considered dangerous because upon degradation, halogens or hydrogen halides such as hydrochloric acid fumes are given off. Separation of plastics from other refuse is difficult at best unless initiated at the consumer or household refuse collection level while separation of types of plastics from one another is even more difficult or is considered impractical.

Recycling of separated plastics has been considered whereby, for example, scrap or used polyethylene materials are ground up and molded to prepare new products. However, such processes for reclaiming require separation of plastics by kind since the use of plastic mixtures recovered from refuse have not previously been considered feasible to produce generally useful products.

SUMMARY OF THE INVENTION

The present invention is directed to methods of treating waste plastics comprising mixtures of various types of these materials and to methods and compositions for utilizing or disposing of such plasic mixtures in useful and practical ways. According to the invention, mixtures of plastic products are ground to produce particulate plastic mixtures, the plastic is washed or otherwise treated to remove undesirable non-plastic materials and the resulting composition is thereafter treated thermally to produce various products in which single plastic homogeneity is not critical. Alternatively, the particulate plastic may be used as filler for bitumenous or asphalt compositions for roads or similar surfaces. Particulate plastic mixtures may be further treated by liquid floatation means to separate certain plastics having undesirable burning characteristics such as acrylonitriles, etc., after which the recovered plastic particles may be combined with cellulosic compositions to produce combustible materials such as fireplace logs and the like. These as well as other advantages of the invention will be evident from the following detailed description.

DETAILED DESCRIPTION OF THE INVENTION

The initial step in the recycling process according to the invention comprises placing the plastic products in a grinding, cutting or granulating apparatus to reduce the scrap product to particles or shreds. Any one or combination of a number of devices may be used for fragmenting or particulating the plastic including mill cutters, granulators and the like. The mill cutters may be selected from any desired size depending on the size of the bottle, container or other product which is to be ground by the cutting tool. Further, the spacing and number of teeth on the cutting head or bit may also be varied depending on the size or size range of the particles desired to be obtained. For example, where relatively narrow plastic bottles of the type commonly used for liquid detergents, shampoo and the like are to be ground, the mill cutter surface may be between about 1 and about 2 inches long and any suitable diameter. The spacing, number and depth of the cutting teeth may be varied as well as the speed at which the cutter is turned depending on the rate of cutting or grinding desired and particle size.

The grinding phase may be also carried out in one or more steps as desired. Thus, the first phase may utilize a rough grinding mill cutter which yields rather course particles, ribbons or granules of the plastic which particles may thereafter be further directed to a fine grinding step to yield finer particles. In addition, a granulator apparatus may be used in a single step, which apparatus is known to include rotor knives in combination with a sieve whereby the courser particles which do not pass through the sieve openings or apertures are further ground or cut until the desired small particle size is achieved. Again, such apparatus is well known to those skilled in the art and need not be described in further detail. Obviously, depending on the type of grinding equipment used, be it rough or fine, particle sizes will vary. However, particles capable of passing through 5–25 mesh screens will be suitable for most uses.

The second step involves washing of the particles to remove non-plastic materials such as paper, labels, container residue, metal particles and the like which will be unsuitable if the particles are to be later recycled for molding, forming or casting. However, if the particles are to be used for asphalt fillers or in preparing a combustible fire place logs or similar combustible products as will be more fully explained hereinafter, it is usually not necessary that the residual non-plastic materials be removed. In addition, if extensive non-thermoplastic materials are present such as bottle caps and the like, these may be removed prior to the initial grinding step. For example, the bottles or containers may be passed through pinch rollers and over-sized grates whereby the smaller cracked bottle caps, etc. will be separated by falling through the grate.

The washing step is accomplished by any desirable means such as soaking the plastic particles in a liquid, usually aqueous, with suitable agitation. The liquid should be of a specific gravity so that the plastic particles may be floated away from the non-plastic materials and thereafter recovered on a sieve or screen. If a further fine grinding step is then desired, depending on the appartus chosen, it may then be carried out on the recovered plastic particles.

During the grinding or granulating phase, it may also be desirable to use an antistatic agent especially where the particles are subjected to a fine grinding operation. It has been found that where relatively small particles are produced, the static electrical charges may cause difficulty in handling or recovering the particles from the cutter. Accordingly, when the wash solution contains antistatic agents such as high molecular weight fatty alcohols or other known polymeric anti-static agents, the static electrical problems will be obviated.

Depending on the various types of plastics present in the particular mixture, the plastic composition can be reused for molding, casting or otherwise forming various products. In preparing new molded or cast products from the mixed plastic particle compositions, it is desirable to utilize relatively small particles which are shaped as nearly spherical as possible. Accordingly, where the recovered plastic particles are to be thermally molded or cast, they are preferably further subjected to a mulling phase. The term mulling as used herein is understood to mean any operation which physically transforms irregular particles to a more spherical shape. A number of devices are commercially available for this purpose. The mulling step yields particles which will be more readily compacted than irregular shaped particle mixtures. Such a feature is important in achieving a higher density molded or cast product since initial spacing or separation between particles is minimized, thereby minimizing the amount of flow required. This feature further avoids entrapment of air which would otherwise not only decrease product density but would increase polymer oxidation and degradation due to the presence of entrapped oxygen. Again, however, where the particles are not to be used for molding or casting the mulling step may be omitted. For example, where the particles are to be used as filler for bitumen or asphalt materials or for combustible products, shreds, ribbons or other highly irregular particles may be directly processed without the additional particle shaping step or steps.

RECYCLING FOR CAST OR MOLDED PRODUCTS

By way of example, several used plastic bottles were cleaned to remove paper, labels and other undesirable non-plastic impurities, dried and subjected to a grinding operation. The grinding apparatus comprised a Severance Tool Cutter having 31 helical teeth per inch which cutter was driven at 3450 RPM. The plastic bottles comprised clear polyethylene and orange PVC and which were held against the revolving cutter surface. Small plateletts (about 0.03 × 0.03 × 0.005 inch) were obtained and boiled in salt water to remove static electricity. The particles were then subjected to a mulling operation between sheets of 4/0 sand paper. Mulling was accomplished by pressing the particles between an oscillating metal block and the sand paper sheets. The resulting particles appeared to be substantially spherical and packed to a high bulk density. The particles were then placed in a casting dish and heated in an oven or on a hot plate set at about 500°F. Heat transfer to the particles was slow and overheating is initially controlled by the heat of fusion. The sample was removed after about 12 minutes, at which time fusion of the polyethylene was essentially complete but degradation was minimal. It was observed that the polyethylene softened and melted thereby surrounding and adhering to the PVC particles. The product achieved was a good quality cast bar having substantially no visible porosity. The product was not brittle and had good impact and strength properties.

In another example, various plastic products were subjected to the same grinding and mulling procedure as above described to achieve a particle mixture of approximately 44% low density polyethylene, 19% high density polyethylene, 31% styrene and 6% PVC, by weight. The mixture was selected to generally reflect mixture of scrap bottles, containers, etc. which might be found in municipal refuse. The particle mixture was placed in the casting vessel and heated by a hot plate for a period of 12 minutes. It was found that the mixture fused to a relatively dense bar having substantially the same impact and strength properties as noted above although some porosity was noted.

A mold or cast of any desirable shape or an extension device may be used in treating the plastic mixtures to achieve a great variety of useful plastic products. Again, the important feature in heating the mixtures in the mold or cast is to use a temperature sufficient to melt the lower melting plastics, but lower than the melting or degradation temperature of the highest melting plastic present. Accordingly, the temperature reached above was controlled by heating time to avoid degradation of PVC which is known to occur at about 250°F. However, if the sample is to be heated for a longer period of time, the heat of the mixture may be controlled by simply heating at the temperature which will avoid melting or degradation of the highest melting plastic of the mixture. Otherwise it may be necessary to monitor the sample temperature.

COURSE GROUND SCRAP FOR BITUMEN OR ASPHALT FILLER

A mixture of course ground clear polyethylene and orange PVC ribbons was prepared by grinding plastic bottles in a mill cutter 1¾ inch diameter × 1 inch long having 10 teeth around the cutter periphery. The cutter was turned 3500 RPM and ribbons having dimensions of about 0.005–0.02 inch thick by 0.02–0.06 inch wide by 0.06–1.0 inches long were recovered. The ribbons were mixed in a commercial cut back, i.e. solvent thinned, asphalt composition in a weight ratio of 30% plastic:70% asphalt. The plastic was readily wet by the asphalt and mixing was accomplished without difficulty and quickly stabilized the asphalt from further flowing. The plastic stabilized asphalt was compared to a similar asphalt in which sand was substituted for the plastic particles. Once the asphalt solvent had evaporated from both samples, it was noted that the plastic filled asphalt composition had significantly higher strength to hand pulling.

A further plastic filled asphalt composition was prepared with fine ground material as described hereinabove. The properties of the asphalt bar were found to be substantially similar to the plastic filled asphalt utilizing the larger ribbons but entrapped air and voids were more easily worked out of the bar. The sample prepared was found to have substantially greater hand pull strength as compared to the sample which was filled only with sand particles.

Plastic filled asphalt is also observed to have substantially improved water and moisture resistance than sand filled asphalt. Such a feature will be appreciated since sand is somewhat incompatible with bitumen or asphalt and is readily wetted with water because of its hydrophilic nature. Thus, asphalt or bitumen does not readily wet or adhere to sand because of the hydrophobic nature of those hydrocarbon based materials. On the other hand, plastics are hydrophobic as compared to sand and are readily wetted by the asphaltic materials thereby resulting in a product having improved resistance to moisture and water as well as the improved strength characteristics noted above. Accordingly, it is believed that the use of scrap plastic particles for filling asphalt or bitumen either along or combined with same will yield an improved product as compared to presently used asphalt compositions incorporating only aggregate and/or sand fillers. The shape is preferably a ribbon, since the filler is added only to prevent cold flow under pressure. Thus, the ribbons act as fiber-like materials in maintaining asphalt integrity. Large ribbons will not pack well, even though steam rolled, so a size compatible with the final asphalt surfacing thickness is dictated. The course ribbon described herein is not too large for most applications, though "fines" would be needed for seal coats. The presence of various types of plastic do not appear to be critical for use in asphalt materials nor do the plastics need necessarily be of different types.

COMBUSTIBLE PLASTIC FILLED PRODUCTS

The use of scrap plastic particles as fillers or bulk material in preparing combustible products such as fireplace logs and the like, although desirable to acquire an effective means for disposing of the scrap plastics presents a special problem because of halogen containing plastics which are common in scrap plastic mixtures. Polyvinyl chloride (PVC) is a commonly used plastic for many containers because of its relatively low cost and flexibility especially in making squeeze-type bottles. It is well understood that upon combustion or degradation of halogen containing plastics, the halogens will be freed as vapors and usually in the form of hydrogen halides such as hydrogen chloride. Accordingly, attempts to burn PVC are obviously undesirable. However, where halogen containing plastic materials or acrylonitrile polymers are to be removed from the plastic mixture, they may be separated by a floatation technique. Such a technique comprises floating the mixed plastic particles including the undesirable plastic materials, in a liquid having a density greater than the desired plastics to be recovered but less than that of the halogen containing plastic. For example, in separating PVC from polyethylene-styrene-PVC mixtures, the use of a liquid having a density of about 1.09–1.10 gm/cc will separate PVC which has a density of about 1.16–1.45. Acrylonitriles such as ABS (acrylonitrile-butadiene-styrene) plastics can similarly be separated since the latter has a density of about 1.1–1.2 whereas polyethylene has a density of about 0.91–0.97 gm/cc.

By way of example, a solution of 1.27 pounds potassium nitrate per gallon of water was prepared having a density of approximately 1.09 g/cc. The particle mixture of 44% low density polyethylene, 19% high density polyethylene, 31% styrene and 6% PVC prepared as described above, was placed in the aqueous solution in the form of the course plastic ribbons. The PVC sank to the bottom of the vessel containing the solution and the remaining floating plastic material was separated, it being found that over 94% of the desired non-halogen containing plastics was recovered. The plastic ribbons were then mixed with a slurry of shredded used newspaper in a weight ratio of between 10%–75% plastic paper. The materials were recovered from the slurry on a fine screen and compressed to remove most of the water and allowed to dry. In another sample, only the paper was used without plastic filler and compressed to approximately the same density and allowed to dry. These materials were shaped in the form of elongated pieces of approximately 1 foot in length and between about 3 and about 6 inches wide at their widest part and ½–1 inch thick. The paper sample alone was ignited and found to glow and smoke only along the edges but was not satisfactorily combustible. On the other hand, samples containing about 25%, 50% and 75% plastic ribbons ignited readily and burned well thereafter in a manner similar to soft wood such as pine logs or pieces of similar size. Accordingly, it is evident that the addition of the scrap plastic materials enhanced combustion properties. Such products serve as a practical means of disposing of the scrap materials thereby being desirable not only from a waste disposal standpoint but also evidencing commercial advantages and uses. It will be appreciated that the density of such combustible products may be varied depending on the desired burning rate as well as other variations including the preparation of desired slurries and use of other combustible cellulosic-type materials as will be appreciated by those skilled in the art. It should also be noted that olefinic materials and especially low cost or waste olefins or aliphatic compounds such as paraffins or natural resins such as pine tar, pitch and the like which burn easily may be substituted for a portion of the plastic particles. The substitution of these materials will be desirable when sufficient waste plastics of the desired types are not readily available.

Odors from the burning samples are not especially strong but might be considered objectionable in certain circumstances. These odors can be masked or typical odors of burning wood may be created by adding agents such as those used in various fragrances. Those familiar with the art of odor control will appreciate the aesthetic value of adding artificial odors.

I claim:
1. A method of disposing of mixed waste thermoplastic materials comprising halogen containing plastics and non-halogen containing plastics comprising the steps:
   a. grinding the materials to form a particulate thermoplastic mixture;
   b. separating low and high density plastics by floating the mixture through a liquid holding chamber containing a liquid having a density of less than the density of halogen containing plastics;
   c. recovering the floating particles;
   d. mixing the recovered particles with a slurry of cellulosic material; and
   e. compressing the mixture of step (d) to form a combustible product.
2. The method of claim 1 wherein the mixture comprises polyethylene and polyvinyl chloride plastics.

* * * * *